(No Model.)
J. H. BROWN & L. B. WELCH.
CARRIAGE BRAKE.
No. 532,137. Patented Jan. 8, 1895.
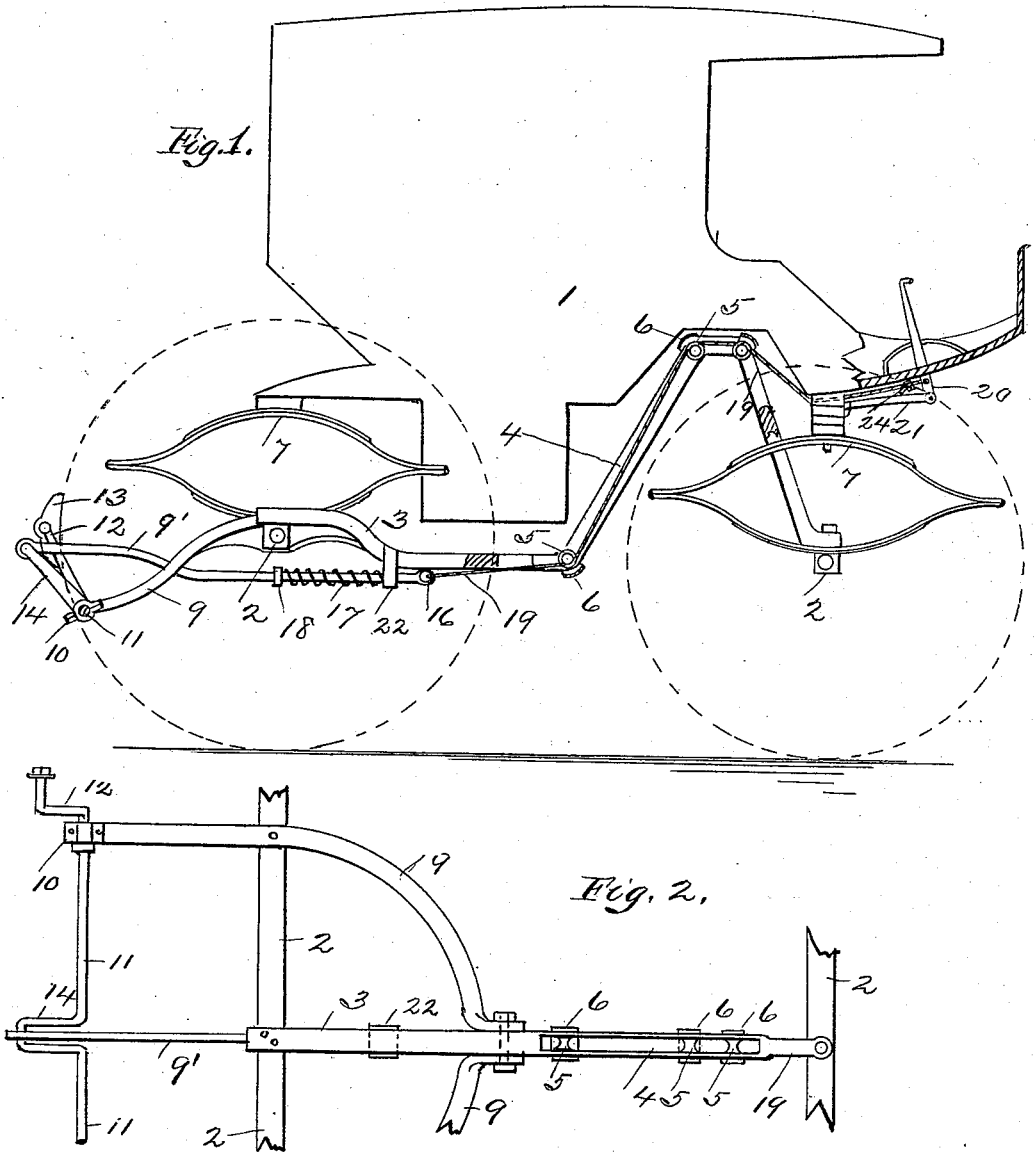
Witnesses:
M. E. Harrison.
J. A. Herron.
Inventors.
J. H. Brown
L. B. Welch
Per O. D. Levis
Atty.

UNITED STATES PATENT OFFICE.

JAMES H. BROWN, OF BOSTON, AND LOUIS B. WELCH, OF SHIRE OAKS, PENNSYLVANIA.

CARRIAGE-BRAKE.

SPECIFICATION forming part of Letters Patent No. 532,137, dated January 8, 1895.

Application filed March 14, 1894. Serial No. 503,582. (No model.)

*To all whom it may concern:*

Be it known that we, JAMES H. BROWN, of Boston, Allegheny county, and LOUIS B. WELCH, residing at Shire Oaks, county of Washington, State of Pennsylvania, citizens of the United States, have invented certain new and useful Improvements in Carriage-Brakes and Coupling-Poles; and we do hereby declare the following to be a full, clear, and exact description of the invention, such as will enable others skilled in the art to which it pertains to make and use the same, reference being had to the accompanying drawings, which form a part of this specification.

Our invention relates to an improved carriage brake, and axle coupling, and consists in certain details of construction, as will be fully described hereinafter.

In the accompanying drawings, Figure 1 is a side elevation of a carriage provided with our improved brake and coupling, a part of which is shown in section. Fig. 2 is a plan view of the coupling bar, and a portion of the brake.

To put our invention into practice with a carriage 1, and thereby provide a brake for the same, and also to attach the two axles together by means of a rigid coupling pole, we form from a bar of metal a coupling 3 one end of which is rigidly attached to the rear axle 2 of the vehicle, and the other bent upward and down in the form of the letter V and attached to the front axle 2 by a pin in a manner that will permit the same to be revolved. This coupling bar is formed with a slotted portion 4 for the purpose of pivoting therein several small pulleys or sheaves 5 over which a brake cord 19 is guided.

To construct a carriage brake in accordance with our invention, we attach to the coupling bar 3, two rearwardly extending brackets 9, each of which is provided with a journal box 10 in which is arranged a brake bar 11. This brake bar 11 is bent in the center in the form of a crank 14, and at each end at right angles, and provided with a means 12 for attaching the brake shoes 13 thereon. Connected to the crank 14 is a bar 9' which extends forward through a guide 22, and is provided with an eye 16 for the purpose of connecting a flexible wire cord or rope 19 thereto. This brake bar 9' is provided with a rigid collar 18 and a coil spring 17 arranged between said collar and the guide or bearing 22, in a manner that will serve to release the brake from the wheels of the vehicle. The brake rope 19 is attached to the forward end of the bar 9' and passed over suitably arranged sheaves 5 journaled in the slotted portion 4 of the coupling bar 3, and attached to the lower end of an operating lever 20. This lever 20 is pivoted to a bracket 21, and is held at any desired position by means of a toothed rack in a manner well known to the art. The rope 19 is held in position by means of covers 6 arranged over the same.

To operate the brake it is only necessary to move the operating lever 20 forward, which movement draws the rope 19 over the sheaves thereby moving the brake bar 9' and crank 14 forward, which sets the shoes 13 against the rear of the back wheels to retard the motion of the carriage. When the lever 20 is released the spring 17 moves the bar and crank back to release the brake.

Having thus described our invention, what we claim, and desire to secure by Letters Patent, is—

1. A carriage brake consisting of the shoes or rubbers operating against the rear of the back wheels, a crank shaft carrying said shoes or rubbers, a bar connected to said crank, a spring for recovering said bar to release the brake, a flexible cord or connection between the said bar and the operating lever, and suitable sheaves and covers to guide and confine said flexible connection, all arranged and combined for service substantially as described.

2. In combination with a carriage such as described, the coupling 3 one end of which is rigidly attached to the rear axle and the other extremity pivoted to the front axle, the bent portion of the said bar to permit the front wheels to pass beneath, and the slotted portion to allow the brake cord to be arranged therein, as and for the purpose described.

In testimony that we claim the foregoing we hereunto affix our signatures this 26th day of December, A. D. 1893.

JAMES H. BROWN. [L. S.]
LOUIS B. WELCH. [L. S.]

In presence of—
EDWIN P. BROWN,
S. P. KELLER.